United States Patent [19]

Halstead

[11] 4,248,465
[45] Feb. 3, 1981

[54] AUTOMOBILE DOOR LOCK OPERATING TOOL

[76] Inventor: William M. Halstead, 5484 Cedar La., Columbia, Md. 21044

[21] Appl. No.: 22,772

[22] Filed: Mar. 22, 1979

[51] Int. Cl.³ .............................................. B25J 1/00
[52] U.S. Cl. ................................ 294/19 R; 294/99 R
[58] Field of Search .......... 294/1 R, 1A, 19 R, 20–24, 294/50.9, 99 R, 104; 81/3 R

[56] References Cited

U.S. PATENT DOCUMENTS

| 276,572 | 5/1883 | Evans | 294/22 |
|---|---|---|---|
| 927,546 | 7/1909 | Johnston | 294/19 R X |
| 1,023,077 | 4/1912 | Grout | 294/19 R X |
| 3,265,429 | 8/1966 | Shatt | 294/19 R |
| 3,340,750 | 9/1967 | Noorlun | 81/3 R |
| 3,463,533 | 8/1969 | Repiscak et al. | 294/19 R |
| 3,764,175 | 10/1973 | Yavitch | 294/19 R |

Primary Examiner—Johnny D. Cherry

[57] ABSTRACT

The invention relates to a versatile tool for use by the driver or other occupant of an automobile to facilitate locking and unlocking the automobile doors from the driver's seat or other remote position within the vehicle. The tool comprises a hand-held shaft member having means at one end for resiliently grasping and operating the diverse types of door lock members typically provided on the inside of an automobile door.

6 Claims, 8 Drawing Figures

U.S. Patent     Feb. 3, 1981     4,248,465
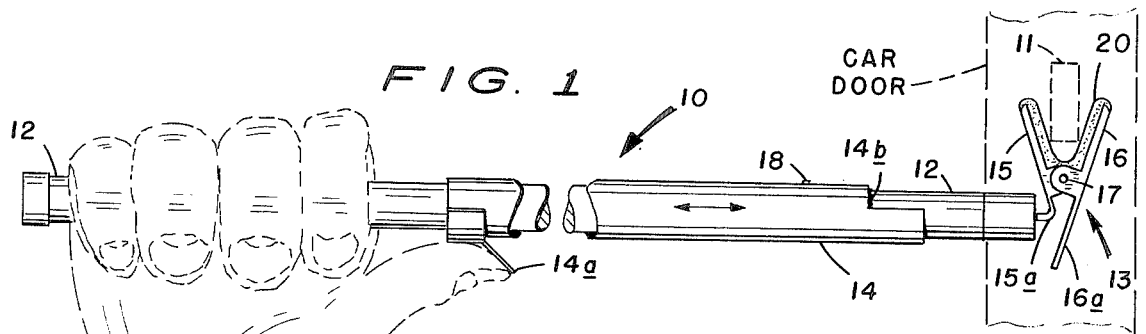
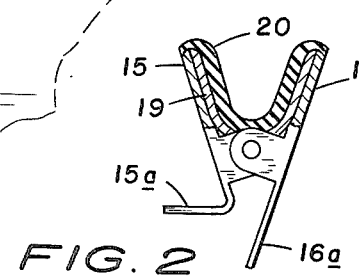
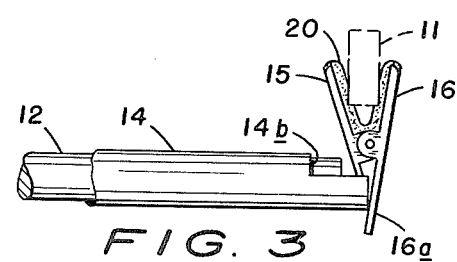
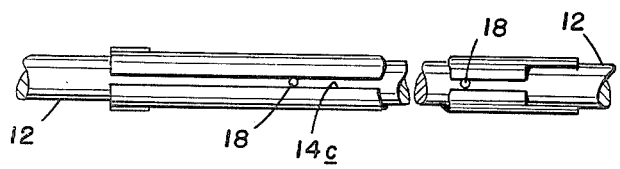
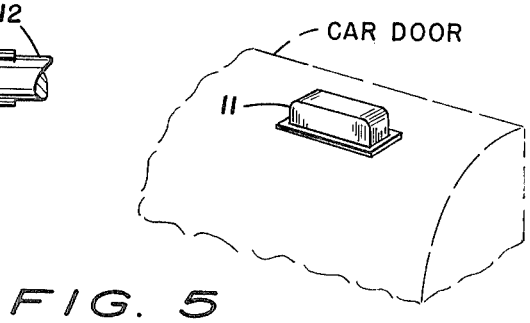
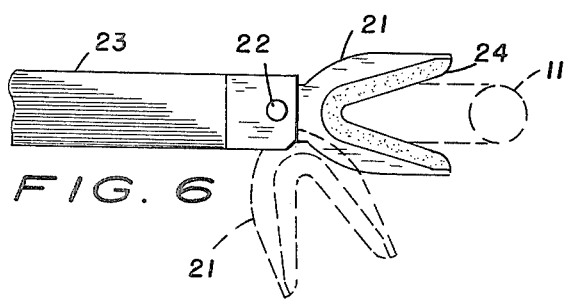
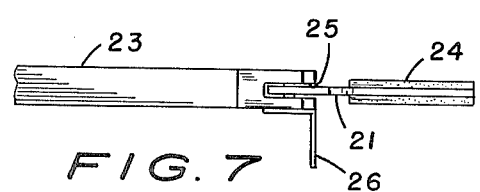
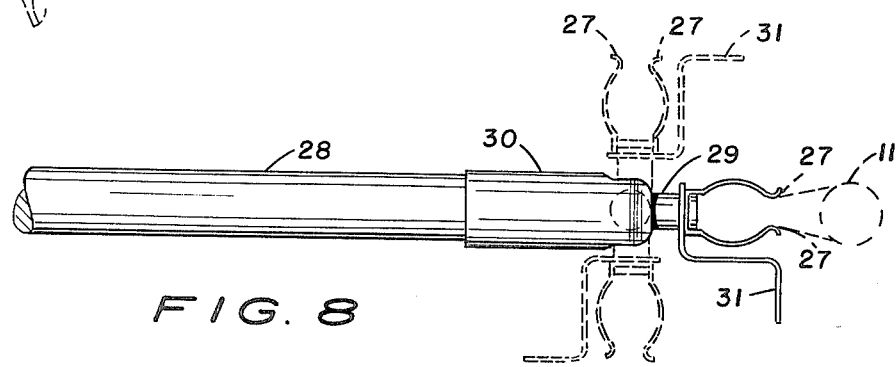

AUTOMOBILE DOOR LOCK OPERATING TOOL

BACKGROUND OF THE INVENTION

Various hand tools have been proposed previously to enable the driver of an automobile to operate the door lock knobs on the opposite side of the vehicle, while in the driver's seat. U.S. Pat. No. 3,760,656, for example, discloses a tool formed with prongs at one end designed to be slid under the enlarged head of a door lock knob and to pry up the knob from its locked to its unlocked position. This tool can also be used as a mallet to tap the door lock knob into its locked position. U.S. Pat. No. 3,764,175 discloses a tool having an "operating head" similarly designed to engage the under surface of an enlarged head on the door lock knob for raising the lock knob to its unlocked position. The "operating head" is configured with a wall member intended to engage the top of the enlarged head for depressing the lock knob into its locked position. U.S. Pat. No. 3,819,221 also discloses a tool for actuating door lock knobs of the type having an enlarged head portion. A generally flat, rigid bar member is formed with a U-shaped notch at one end to slide under the enlarged head of the lock knob and is also intended for raising the knob, to its unlocked position, by engaging the under surface of the enlarged head. At the opposite end of the bar, a recess is provided which can be used to engage the upper surface of the enlarged head for depressing the lock knob to its locked position.

It will be noted from the foregoing description of the prior art that the tools previously proposed are intended for operating door lock knobs solely of the type having an enlarged head at their upper extending end. These prior art tools thus could not be used with the so-called "theft proof" type door lock knobs which are purposely designed without an enlarged head. Moreover, the prior art tools would be difficult, if not impossible, to use for operating door lock knobs located at positions other than on the window ledge; e.g. within a recess in the arm rest structure of the door.

SUMMARY OF THE INVENTION

In accordance with the present invention, a tool is provided which overcomes the foregoing deficiencies of prior art devices; i.e. proposed tool can be used to operate "theft proof" (as well as enlarged head) type door lock knobs of diverse configurations. In addition, provision is made, in accordance with this invention, for operating door lock knobs located within recesses and similar hard to get at locations.

More specifically, the proposed tool of the present invention basically comprises an elongated shaft member designed to be held at one end by the driver (or other user) and having a head member at the opposite end which is capable of firmly grasping the door lock knob with a resilient force-applying surface, for moving it between its locked and unlocked positions. Various embodiments of the present invention will be disclosed in detail hereinafter. In order to facilitate use of the proposed tool, for operating door lock knobs disposed in various, relatively inaccessible locations (e.g. within a recess in the arm rest structure), it is further proposed in accordance with the present invention to pivotally affix the head member to the handle shaft.

In light of the above discussion, an object of the present invention is to provide a simple, yet versatile tool capable of operating the various types of door lock knobs employed on modern-day automobiles.

Other objects, purposes and characteristic features of the present invention will in part be pointed out as the description of the invention progresses, and in part obvious from the accompanying drawings, wherein:

FIG. 1 is a broken plan view of one embodiment of the present invention;

FIG. 2 is a partial sectional view of the head member portion of the FIG. 1 embodiment;

FIG. 3 is partial plan view of the head end of the FIG. 1 embodiment, illustrating the head member grasping a door lock knob (shown in dashed lines);

FIG. 4 is a partial broken plan view of the FIG. 1 embodiment illustrating the manner of guiding a slidable sleeve along the tool shaft;

FIG. 5 is a pictorial view of the door lock knob of rectangular configuration employed on certain current model automobiles and operable by the tool proposed in accordance with the present invention.

FIG. 6 is partial plan view illustrating a second embodiment of the present invention;

FIG. 7 is a partial edge view of the FIG. 6 embodiment; and

FIG. 8 is a partial plan view of a third embodiment of the present invention.

Referring now to the embodiment shown in FIGS. 1-4 of the drawings, the proposed tool 10 is designed to be handheld by the driver of an automobile or like vehicle, for operating the door lock knob(s) 11 is located on the opposite side of the vehicle. The tool comprises an elongated handle shaft 12 of suitable length (for example, about sixteen inches) to which is affixed a head member generally designated at 13. A slidable sleeve member 14 is disposed on the shaft 12. The sleeve member 14 is provided with an extending tab 14a at its left-hand end which enables the user to slide the sleeve 14 by means of her/his thumb, as shown.

The head member 13, at the right-hand end of the tool, is comprised of a pair of jaw members 15 and 16 which are pivotally connected at 17. The member 15 is secured to the handle shaft 12, for example by the angle bar 15a embedded or otherwise affixed to the shaft 12. The second jaw member 16 is provided with a portion 16a which extends into position for actuation by the sleeve member 14. To provide clearance, the sleeve 14 has a cut-out portion 14b which enables the sleeve 14 to be slid to the right (see FIGS. 1 and 4) far enough to engage extension 16a for closing the jaw members 15-16. Referring to FIG. 4, the sleeve 14 is formed with a longitudinal slot 14c which receives a pair of guide posts 18 extending from the shaft 12, for guiding the sleeve 14 on the shaft 12 during sliding movement. As shown in the sectional view of FIG. 2, the jaw members 15-16 are biased towards their open position by a U-shaped leaf spring 19 disposed therebetween. The spring 19 is covered by a lining 20 of suitable resilient material, such as rubber.

To operate the disclosed tool 10, the user (e.g. automobile driver) merely positions the head member 13 so that the door lock knob 11 is within the jaws 15-16. The sleeve 14 is then slid to the right (see FIG. 4), by pressing the thumb against the tab 14a, to actuate the movable jaw member 16. This squeezes the jaws closed and exerts firm, resilient force against opposite side surfaces of the door lock knob 11, thereby enabling the user to raise and lower the knob 11, as desired, to unlock or lock the automobile door. Thus, it should be clear, the proposed tool can be used to grasp and operate many different types of door lock knobs, having round (as in FIG. 2), square, or rectangular stems (as in FIGS. 1, 3 and 5) etc., and without necessitating the presence of an enlarged head on the top of the knob. Moreover, the proposed tool is capable of grasping and operating such variously configured door lock knobs even where only a relatively small surface area is exposed. By way of example, the rectangular lock knob shown at 11 in FIG. 5 may extend less than one-half inch from the surface of the automobile door and yet be readily operated by the porposed tool, due to its resilient grasping force. Conversely, the previously discussed prior art devices would be incapable of operating the lock knob shown in FIG. 5.

A second embodiment of the present invention is shown in FIGS. 6 and 7 and comprises a head member 21 which is pivotally secured, e.g. by pin 22, in the notched end of a rectangular cross-section handle shaft member 23. The head member 21 is formed with a V-shaped notch therein to which is bonded a lining 24 of suitable resilient material, such as rubber.

To operate this device, the user merely positions the head so that the door lock knob 11 (here, shown round) is wedged snugly in the V-shaped notch. The resilient forces then exerted on the lock knob 11 enable the user to raise and lower the lock knob 11, as desired, to unlock and lock the automobile door. As noted previously, on some model cars the door lock knobs are disposed in relatively inaccessible locations, e.g. within recesses in the arm rest or with view thereof obstructed. By merely pivoting the head member 21 within the notch 25 in shaft member 23, to the position shown in dashed line in FIG. 6 so that the notched head 21 is disposed perpendicular to the shaft 23 (similar to the relative placement of the jaws 15–16 in FIG. 1), a user of the device will be better able to reach and operate the lock knobs so located. Here again, the device of the present invention does not rely upon the provision of an enlarged head on the door lock knob.

One further structural feature of the embodiment shown in FIGS. 6 and 7 is worth noting. A right-angle tab member 26 subtends from the head-end of the shaft 23. This tab 26 can be used, e.g. by inserting it in the window slot of the car door, to assist in opening and closing the door.

The other embodiment of the proposed device, shown in FIG. 8, comprises a head member formed with a pair of spring fingers 27 fabricated of metal, for example, which exert a resilient grasping force on a door lock knob 11 received therebetween. Obviously, by properly spacing the fingers 27 any desired configuration and width of lock knob can be accommodated.

The head member is pivotally affixed to the shaft 28 in any suitable manner, such as by means of a ball and socket mechanism. Thus, the support arm 29 would be formed with a ball portion (shown dotted) at its left-hand end which mates with a socket formed within an enlarged collar piece 30 secured to the right-hand end of the shaft 28 in FIG. 8. By way of illustration, the collar piece 30 could be formed with a slot at its right hand end, and the side walls of the slot could have spherical indents therein to receive the ball end of arm 29, thereby permitting the head to pivot (in the plane of the paper) as shown. Also secured to the support arm 29 is an angle tab 31 which functions in the same manner as the tab 26 in FIG. 7.

Various other modifications, adaptations and alterations are, of course, possible in light of the above teachings. It should therefore be understood that, within the scope of the appended claims, the present invention may be practiced otherwise than as specifically described hereinabove.

What is claimed is:

1. A tool for enabling a person to operate the door lock member of an automobile or like vehicle from a remote position inside the vehicle, comprising:
   a handle shaft member, and
   a head member affixed to one end of the handle shaft member for resiliently grasping the door lock member to operate said door lock member between its lock and unlock positions,
   said head member being formed with a substantially V-shaped recess positionable to receive said door lock member, said V-shaped recess being lined with resilient material to resiliently grasp said door lock member when said door lock member is received within said V-shaped recess.

2. The tool specified in claim 1 wherein said head member is affixed pivotally to the end of said shaft member.

3. The tool specified in claim 1 further including means affixed to said one end of said handle shaft member for engaging the automobile door to enable the person holding the handle shaft member to pull the door to a closed position.

4. A tool for enabling a person to operate the door lock member of an automobile or like vehicle from a remote position inside the vehicle comprising:
   a handle shaft member,
   a head member including first and second jaw members pivotally connected to one another to form a jaw to receive said door lock member, said first jaw member being affixed to one end of the handle shaft member,
   said jaw being lined with a resilient lining to resilient grasp said door lock member,
   spring means disposed between said first and second jaw members to bias open the jaw formed thereby, and
   a sleeve member carried on and slidable by the person using the tool along said handle shaft member and engageable with said second jaw member to pivot said second jaw member towards said first jaw member to thereby close said jaw on the door lock member.

5. The tool specified in claim 4 wherein said slidable sleeve member includes means enabling a person holding said handle shaft member to slide said sleeve member with the thumb.

6. The tool specified in claim 5 wherein said sleeve member is formed with a longitudinal slot and further including means protruding from the outer surface of said handle shaft member and extending into said longitudinal slot to guide said slidable sleeve member longitudinally along said handle shaft member.

* * * * *